(12) United States Patent
Kandler

(10) Patent No.: US 6,526,051 B1
(45) Date of Patent: Feb. 25, 2003

(54) ARRANGEMENT FOR IDENTIFYING AN INFORMATION PACKET STREAM CARRYING ENCODED DIGITAL DATA BY MEANS OF ADDITIONAL INFORMATION

(75) Inventor: Michael Kandler, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/181,158

(22) Filed: Oct. 28, 1998

(30) Foreign Application Priority Data

Nov. 3, 1997 (EP) .............................. 97890216

(51) Int. Cl.[7] .............................. H04L 12/28; H04J 3/12; H04N 7/08
(52) U.S. Cl. ..................... 370/389; 370/473; 370/522; 348/467; 386/46; 386/83
(58) Field of Search ................... 386/83, 46; 348/473, 348/467, 475; 370/389, 552, 522, 394, 366, 230, 395.53, 473; 709/204; 710/244

(56) References Cited

U.S. PATENT DOCUMENTS

| | | | | |
|---|---|---|---|---|
| 5,508,733 A | * | 4/1996 | Kassatly | 348/13 |
| 5,835,493 A | * | 11/1998 | Magee et al. | 370/394 |
| 5,844,595 A | * | 12/1998 | Blatter et al. | 348/12 |
| 5,923,812 A | * | 7/1999 | Sakazaki et al. | 386/68 |
| 5,959,659 A | * | 9/1999 | Dokic | 348/7 |

OTHER PUBLICATIONS

Application No. 97 890 135.3 (PHO 97.519 EP–P), pp. 1–27, Fig. 1.

* cited by examiner

Primary Examiner—Hassan Kizou
Assistant Examiner—Afsar M. Qureshi
(74) Attorney, Agent, or Firm—Aaron Waxler

(57) ABSTRACT

A system (1; 49; 65) comprising a data source (2, 4; 50; 66) for supplying an information packet stream containing digital data coded in accordance with a first coding method and/or a second coding method, a processing device (3; 51; 69) for processing an information packet stream, and a data sink (4, 5, 6; 52, 53; 67) for receiving an information packet stream comprises insertion means (37; 62; 71), which the insertion means (37; 62; 71) comprise detection means (38) adapted to detect digital data contained in a sub-stream of the information packet stream and coded in accordance with a second coding method and to supply control information upon detection of such data, and a packet stream generator (16) which, when control information appears, is adapted to insert further digital data coded in accordance with the first coding method and containing additional information about the sub-stream into further information packets of the information packet stream.

15 Claims, 2 Drawing Sheets

Figure 1:
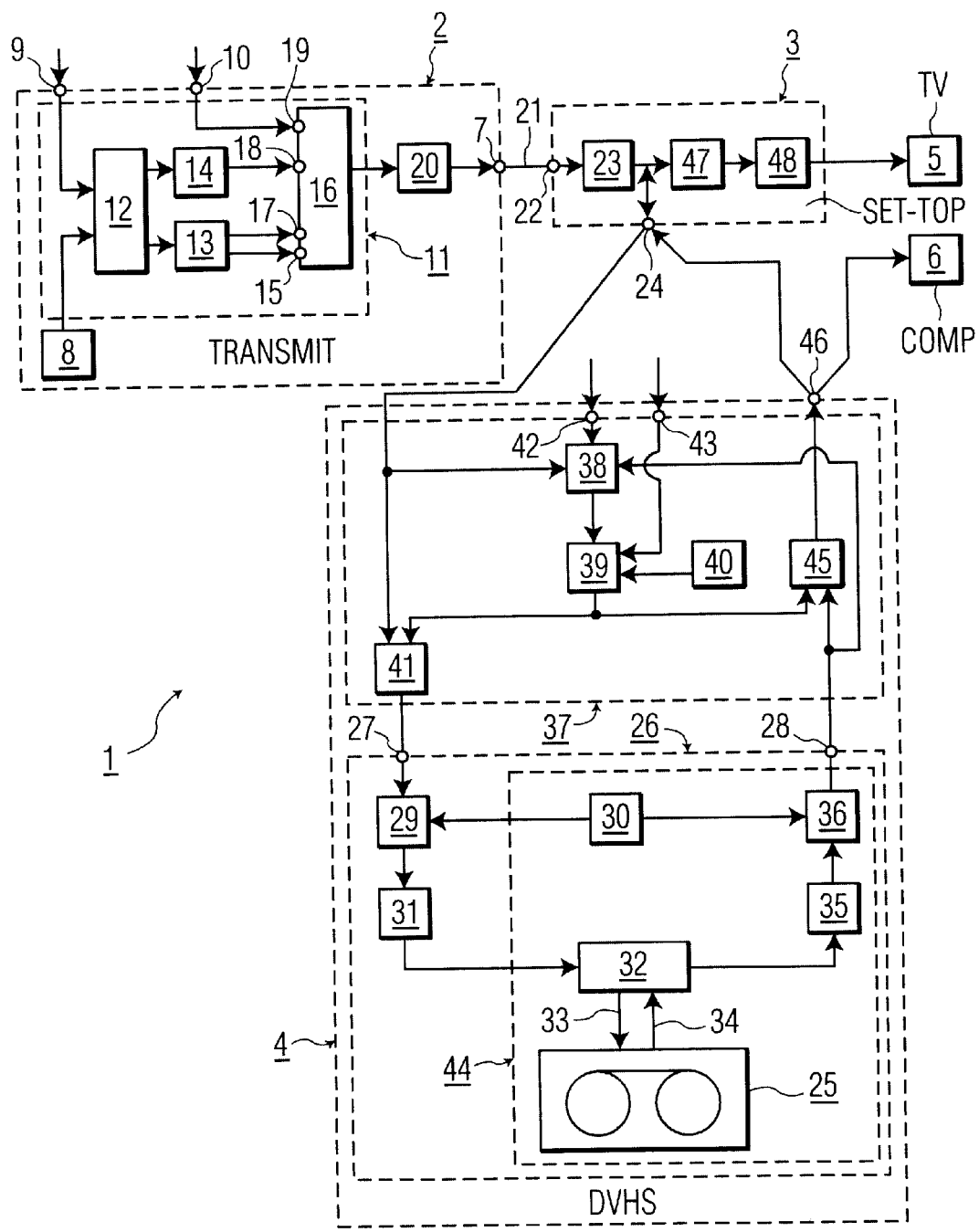

ARRANGEMENT FOR IDENTIFYING AN INFORMATION PACKET STREAM CARRYING ENCODED DIGITAL DATA BY MEANS OF ADDITIONAL INFORMATION

Arrangement comprising insertion means for the identification of an information packet stream carrying encoded digital data by means of additional information.

The invention relates to a system comprising a data source for supplying an information packet stream, and a processing device for processing an information packet stream, and a data sink for receiving an information packet stream, the data source comprising a source for supplying to the processing device an information packet stream including information packets, which information packets contain digital data coded in accordance with a first coding method and/or in accordance with a second coding method and representing picture information or sound information or data information, and the system including a decoder adapted to decode digital data contained on the information packets and coded in accordance with the first coding method.

The invention further relates to a data source for supplying an information packet stream for supplying an information packet stream including information packets, which information packets contain digital data coded in accordance with a first coding method and/or in accordance with a second coding method and representing picture information or sound information or data information.

The invention further relates to a data sink for receiving an information packet stream containing coded digital data in information packets, which digital data can be coded in accordance with a first coding method and/or a second coding method, comprising a recorder for the recording of recording data representing the picture information or sound information or data information contained in the received coded digital data.

The invention further relates to insertion device adapted to receive an information packet stream which contains coded digital data in information packets, which digital data can be coded in accordance with a first coding method and/or a second coding method.

Such a system of the type defined in the first paragraph is known, for example from the European Patent Application having the Application number 97 890 135.3 (PHO 97.519). This known system comprises a plurality of data sources of the type defined in the second paragraph—namely, a transmission device, a cable TV service device, a DVHS apparatus and a DVD apparatus in a reproduction mode. The known system farther comprises a plurality of data sinks of the type defined in the third paragraph—namely, a TV set a DVHS apparatus and a DVD apparatus in a recording mode.

In a recording mode the known DVHS apparatus is adapted to receive picture information or sound information or data information contained in encoded digital data and to record recording data representing said information and complying with the DVHS standard (Victor Company of Japan, No. 07015 of Jul. 25, 1997), on a magnetic tape. The information applied to the DVHS apparatus should then be included in information packets formed by MPEG transport stream packets of an MPEG transport stream. An MPEG transport stream is described in the International Standard ISO/IEC 13.818-1, Part 1 "Systems", of Jun. 8, 1994. Information packets of such an MPEG transport stream can include digital data representing picture information coded in accordance with the MPEG coding method in compliance with the International Standard ISO/IEC 13.818-2, Part 2 "Video" and information packets of said stream can include digital data representing sound information coded in accordance with the MPEG coding method in compliance with the International Standard ISO/IEC 13.818-3, Part 3 "Audio". Other information packets of the MPEG transport stream can include digital data representing picture information or sound information coded in accordance with another coding method than said MPEG coding methods. For example, data information can be constituted by data of an electronic program guide supplied by a broadcasting station in an MPEG transport stream. Furthermore, data information can be formed by data of a computer data base of the Internet can be supplied as an MPEG tort stream by a computer connected to the Internet. Moreover, data information can be formed by data stored on a hard disk of a computer, which data is recorded on a magnetic tape of a DVHS apparatus for backup purposes. Alternatively, information packets of an MPEG transport stream can include coded digital data representing picture information or sound information, which data has been coded by means of another coding method tan the MPEG coding method and is marked as "private data" in an MPEG transport stream. By which coding method coded digital data contained in an MPEG transport stream has been coded depends on the relevant data source.

In the known DVHS apparatus an MPEG transport stream received by the DVHS apparatus is converted into a DVHS information packet stream, which during a subsequent reproduction is reconverted into an MPEG transport stream supplied by the DVHS apparatus. The MPEG transport stream supplied by the DVHS apparatus then corresponds to the received MPEG transport stream to be recorded.

In the known system the processing device is a so-called set-top box arranged between the transmission device and the DIVAS apparatus and to which an MPEG transport stream reproduced by the DVHS apparatus or received and supplied by the transmission device can be applied. The set-top box comprises a decoder for decoding coded digital data contained in the MPEG transport stream packets of the MPEG transport stream and coded in accordance with the MPEG coding method, which now forms the first coding method, said data representing the picture information or the sound information.

In connection with the known system it has been found that an MPEG transport stream supplied by the transmission device or reproduced by the DVHS apparatus, in which the MPEG transport stream packets include digital data coded by means of another, i.e. second, coding method and not coded by means of the MPEG coding method, cannot be decoded by the decoder, As a result of this, the user of the know system cannot determine why his TV set produces neither picture nor sound although he has selected the program of a given transmission device with the aid of the processor or although he has set the DVHS apparatus to the reproduction mode. Moreover, the user of the known system can neither dethrone the type of information reproduced by the DVHS apparatus nor can he obtain additional information about the content of the information reproduced by the DVHS apparatus.

It is an object of the invention to eliminate the problems outlined hereinbefore and to provide an improved system of the type defined in the first paragraph, an improved data source of the type defined in the second paragraph, and an improved data sink of the type defined in the third paragraph, in which the afore-mentioned problems are avoided Furthermore, it is an object of the invention to provide insertion devices of the type defined in the fourth paragraph, which can be included both in a data source or in a processor or in a data sink, or which can take the form of a separate device and which enables the afore-mentioned problems to be avoided.

According to the invention, in order to achieve this object in a system of the type defined in the first paragraph, the system comprises an insertion device which—when digital data coded in accordance with a second coding method are present in the information packets—are adapted to insert further digital data coded in accordance with the first coding method into further information packets of the information packet stream, the coded farther digital data containing picture information or sound information as additional information relating to the digital data contained in the information packets, which digital data are coded in accordance with the second coding method and can therefore not be decoded correctly by the decoder. In this way, it is achieved that a user of a TV set, which forms a data sink of the system, receives additional information related to the information supplied by the data source if the coded digital data representing the information have been coded in accordance with a second coding method and not allowing a correct coding with the aid of the decoder. Additional information can be formed by a text which can be displayed by means of the TV set and which informs the user that, unfortunately, the received information cannot be reproduced because the TV set is not suitable for this. However, alternatively additional information can be spoken information which is reproducible by means of the TV Set and by which a person inform a user of a system in accordance with the invention that the received information cannot be reproduced or that a special facility is needed for the reproduction of the information.

Likewise, a recording and reproducing apparatus, which now forms a data sink, can be constructed so as to enable a user to apply to the recording and reproducing apparatus additional information about the type of information to be recorded or additional information about the contents of the information to be recorded The recording and reproducing apparatus then records this additional information on a record carrier as digital data coded by means of the first coding method, together with the information to be recorded, which is received by the recording and reproducing apparatus as digital data coded by means of a second coding method. During a subsequent reproduction of information from this record carrier the user of the recording and reproducing apparatus receives, in addition to the information which has been recorded on the record carrier and which cannot be decoded correctly by the decoder, additional information which can be decoded by the decoder and which can be displayed or reproduced acoustically by means of a TV set.

Furthermore, further information packets, which contain additional information coded in accordance with the first coding method and which specify for example the type of coding method used for information to be supplied by a data source, can already be included in an information packet stream in the data source. These further information packets are supplied by the data source together with the information packets in a stream of information packets which contain digital data coded in accordance with a second coding method and which should also be supplied by the data source. This has the advantage that this additional information is recorded simultaneously during recording of the information packet stream on the record carrier by means of a recording and reproducing apparatus and during reproduction by means of this apparatus or another reproducing apparatus can be decoded by the decoder so as to give a user a message which relates to the recorded information and which can be displayed by means of a TV set or a computer monitor.

An information packet stream can comprise a plurality of program streams, which each comprise a plurality of sub-streams. The information packets of a sub-stream are linked by address data. Information packets of different sub-streams succeed one another in the information packet stream. A program stream can include for example a sub-stream containing picture information and a subs-stream containing sound information from a TV transmission device. In an advantageous manner the insertion device can be constructed in such a manner information packets in a further sub-stream with digital data coded in accordance with the first coding method are assigned to those program streams whose information packets contain exclusively digital data coded in accordance with a second coding method.

In a system having the above characteristic features, it has proved to be advantageous if, in addition, the source device are adapted to supply an MPEG transport stream comprising MPEG transport stream packets as an information packet stream in accordance with an MPEG standard (ISO/IEC 11172-1, ISO/IEC 13.818-1) to the processing device, which MPEG transport stream packets contain digital data, which represent picture information or sound information or data information, coded in accordance with an MPEG coding method in compliance with an MPEG standard (ISO/IEC 11172-2, ISO/IEC 11172-3, ISO/IEC 13.818-2 or ISO/IEC 13.818-3) and/or in accordance with a second coding method, and the system comprises decoding device adapted to decode digital data contained in the MPEG transport stream packets and coded in accordance with and MPEG coding method, and the insertion device, when digital data coded in accordance with a second coding method and contained in the MPEG transport stream packets are present, are adapted to insert further digital data coded in accordance with an MPEG method into further MPEG transport stream packets of the MPEG transport stream. Since MPEG decoders are widely used in the field of home-entertainment electronics, in professional equipment and in the field of computer technology, this yields the advantage that the additional information coded in accordance with the MPEG coding method can be decoded by a multitude of decoders used in a processing device or a data sink of the system.

According to the invention, in order to achieve the afore-mentioned object in a data source of the type defined in the second paragraph, insertion devices have been provided, which insertion devices—when digital data coded in accordance with a second coding method are present in the information packets—are adapted to insert further digital data coded in accordance with the first coding method into flirter information packets of the information packet stream, the coded further digital data containing picture information or sound information as additional information relating to the digital data contained in the information packets. As a result of this, a user of an apparatus comprising s adapted to decode digital data coded in accordance with the first coding method receives additional information to the information coded by the data source by means of an arbitrary second coding method. The data source can add additional information to the information to be supplied by the data source automatically or under control of the user.

Moreover, this provides a reproducing apparatus, which constitutes a data source, wherein in a reproduction mode additional information in further information packets of a further sub-stream are added to a reproduced information packet stream or a reproduced sub-stream of the information packet stream which exclusively comprises information packets containing data coded in accordance with a second coding method. This has the advantage that during the reproduction of the information packet stream the user of the reproducing apparatus when it is adapted to decode digital data coded in accordance with the first coding method or when it is connected to a processing device or a data sink adapted to decode digital data coded in accordance with the first coding method—receives additional information about the other information packets. Further, reference is made to the advantages mentioned in connection with the system in accordance with the invention in relation to a data source.

In a data source having the characteristic features above, it has proved to be advantageous if, in addition, the source comprise first coding device for coding digital data in accordance with a first coding method and for supplying coded digital data, and the source comprise second coding device for coding digital data in accordance with a second coding method and for supplying coded firer digital data, and the source include a packet stream generator adapted to insert the coded digital data into information packets of an information packet steam and to insert the coded further digital data into further information packets of the information packet stream. This has the advantage that a data source is obtained which is adapted not only to supply an information packet stream containing coded digital data already applied to the data source in coded form, but which is also adapted to independently code digital data applied to the data source in accordance with a first or a second coding method Advantageously, an information packet stream supplied by the data source and each sub-stream of a program stream of the information packet stream ten always includes information packets with digital data coded in accordance with the first coding method.

In a data source having the aforementioned characteristic features, it has proved to be advantageous if, in addition, the data source is adapted to cooperate with an information memory which stores digital data representing picture information or sound information or data information, and coding selection is provided, which is adapted to read out digital data stored in the information memory and to supply the digital data selectively to the first coding device or the second coding device, and the coding selection device, when digital data are supplied to the second coding device, are further adapted to supply an insertion control signal, and when an insertion control signal is present the packet stream generator is adapted to insert further information packets into the information packet stream, which flirter information packets contain further digital data coded in accordance with the first coding method. This has the advantage that a data source is obtained in which in a manner adapted to each specific use—i.e. depending on the type of information to be supplied by the data source and depending on the processing device or the data sink which should receive and process the coded digital data supplied by the data source—the appropriate coding device and the appropriate coding method is selected by the data source itself or by a user. During the selection of the second coding device for coding the digital data it is advantageous when tee data source automatically inserts information packets with digital data coded in accordance with the fist coding method into the corresponding sub-stream of the information packet stream.

In a data source having the characteristic features defined above, it has further proved to be advantageous if, in addition, detection device has been provided, which detection device is arranged to receive an information packet steam and is adapted to detect digital data contained in information packets and coded in accordance with a second coding method and to supply control information upon detection of such data, and when control information appears the insertion device is adapted to insert further digital data coded in accordance with the first coding method into further information packets of the information packet stream. This yields a data source comprising detection devices which test the digital data applied to the data source and already coded in accordance with a coding method and then detect program streams and sub-streams which include digital data coded in accordance with another, i.e. a second, coding method and not coded in accordance with the first coding method, which detection device supplies control information upon detection of such data When control information occurs it is advantageous if the data source inserts information packets with digital data coded in accordance with the first coding method into the information packet stream, said digital data forming additional information relating to the coded digital data applied to the data source.

In a data source having the characteristic features above, it has further proved to be advantageous if, in addition, the insertion device includes a picture information memory which stores digital data coded in accordance with the first coding method and representing at least picture information, and when the information packets contain digital data coded in accordance with a second coding method the insertion device is adapted to insert coded digital data stored in and read out of the picture information memory into further information packets of the information packet stream. This yields a data source having a picture information memory which stores the digital data coded in accordance with the first coding method, which digital data represent additional information in the form of picture information and which can be inserted directly into further information packets of an information packet stream supplied by the data source. Advantageously, the provision of first coding device in the data source can be dispensed with, as a result of which a particularly low-cost data source is obtained.

In a data source having the characteristic features defined above, it has further proved to be advantageous if in addition, the source is adapted to supply an MPEG transport stream comprising MPEG transport stream packets as an information packet stream in accordance with an MPEG standard (ISO/IEC 11172-1, ISO/IEC 13.818-1), which MPEG transport stream packets contain digital data coded in accordance with an MPEG coding method in compliance with an MPEG standard (ISO/IEC 11172-2, ISO/IEC 11172-3, ISO/IEC 13.818-2 or ISO/IEC 13.818-3) and/or in accordance with a second coding method, and the insertion device, when digital data coded in accordance with a second coding method and contained in the MPEG transport stream packets are present, are adapted to insert further digital data coded in accordance with the MPEG method into further MPEG transport stream packets of the MPEG transport stream. Since MPEG decoders are widely used both in the field of home-entertainment electronics, in professional equipment and in the field of computer technology, this has advantage that a data source is obtained which supplies an information packet stream together with additional information coded in accordance with the MPEG coding method, which additional information can be decoded by a multitude of processing devices or data sinks.

According to the invention, in order to achieve the afore-mentioned object in a data sink of the type defined in the third paragraph, insertion devices have been provided which—when digital data coded in accordance with a second coding method are present in the received information packets—are adapted to insert further digital data coded in accordance with the first coding method into further information packets of the information packet stream, the coded further digital data containing picture information or sound information as additional information relating to the digital data contained in the information packets and coded in accordance with a second coding method. This yields a data sink comprising a recording device, in other words a recording apparatus, wherein in a recording mode additional information in further information packets of a further sub-stream, which have been coded in accordance with the first coding method, are added to an information packet stream or a sub-stream of the information packet stream—which exclusively comprises information packets containing digital data coded in accordance with a second coding method—in order to be recorded on a record carrier. This has the advantage flat during the reproduction of the information packet stream from the record carrier the user of an arbitrary reproducing apparatus—which is adapted to decode digital data coded in accordance with the first coding method or which is connected to a processing device or a data sink adapted to decode digital data coded in accordance with the first coding method receives additional information relating to the digital data coded in accordance with the second coding method and contained in information packets of the information packet stream. Further, reference is made to the advantages mentioned in connection with the system in accordance with the invention in relation to a data sink.

In a data sink having the characteristic features defined above, it has proved to be advantageous if, in addition, a detection device, arranged to receive a received information packet stream and adapted to detect digital data contained in information packets and coded in accordance with a second coding method and to supply control information upon detection of such data, is provided and when control information appears the insertion device are adapted to insert further digital data coded in accordance with the first coding method into further information packets of the information packet stream. This yields a data sink comprising a detection device which test the digital data received from the data source or additional information relating to tho coded digital data and then detect digital data coded in accordance with a second coding method, and which upon detection of such data supplies control information. When control information occurs it is advantageous if the data sink inserts information packets with digital data coded in accordance with the first coding method into further information packets of the information packet stream, said digital data forming additional information relating to the digital data applied to the data source and coded in accordance with the second coding method.

In a data sink having the characteristic features as above, it has further proved to be advantageous if, in addition, the insertion ,device includes a picture information memory which stores digital data coded in accordance with the first coding method and representing at least picture information, and when the information packets contain digital data coded in accordance with a second coding method the insertion device is adapted to insert coded digital data stored in and read out of the picture information memory into further information packets of the information packet stream. This yields a data sink having a picture information memory which stores the digital data coded in accordance with the first coding method, which digital data represent additional information in the form of picture information and which can be inserted directly into further information packets of an information packet stream which can be recorded by the data sink. Advantageously, the provision of a first coding device in the data sink can be dispensed with, as a result of which a particularly low-cost data sink is obtained.

In a data sink having the characteristic features defined above, it has further proved to be advantageous if, in addition, the data sink (4) is adapted to receive an MPEG transport stream as information packet steam, which in MPEG transport stream packets in accordance with an MPEG standard (ISO/IEC 11172-1, ISO/IEC 13.818-1), contains digital data coded in accordance with an MPEG coding method in compliance with an MPEG sad (ISO/IEC 11172-2, ISO/IEC 11172-3, ISO/IEC 13.818-2 or ISO/IEC 13,818-3) and/or in accordance with a second coding method, and the insertion device, when digital data coded in accordance with a second MPEG coding method and contained in the MPEG transport stream packets are present, are adapted to insert further digital data coded in accordance with the MPEG method into further MPEG transport stream packets of the MPEG transport streams Since MPEG decoders are widely used both in the field of home-entertainment electronics, in professional equipment and in the field of computer technology, a data sink, such as for example a recording apparatus, is obtained which inserts additional information coded in accordance with the MPEG coding method into further information packets of the information packet stream and records them on a record carrier. During subsequent reproduction of the information packet stream from the record carrier the additional information can be processed and reproduced by a multitude of processing devices or data sinks. Thus, during the reproduction of the information packet stream the user of the reproducing apparatus receives additional information relating to the information packets comprising digital data coded in accordance with the a second coding method.

According to the invention, in order to achieve the afore-mentioned further object insertion device of the type defined in the fourth paragraph are character in that detection devices have been provided, which detection devices are adapted to detect digital data contained in information packets and coded in accordance with a second coding method and to supply control information upon detection of such data, and a packet stream generator has been provided, which generator when control information appears is adapted to insert her digital data coded in accordance with the first coding method into further information packets of the information packet stream, the coded further digital data representing picture information or sound information as additional information relating to the digital data contained in the information packets and coded in accordance with a second coding method. This yields an insertion device which test coded digital data of an information packet stream received from the insertion device or which analyze additional information relating to the coded digital data and then detect digital data coded in accordance with a second coding method, and which upon detection of such data supply control information. When such control information occurs it is advantageous if the insertion device insert information packets with digital data coded in accordance with the first coding method into the information packet stream, said digital data forming additional information relating to the digital data applied to the data source and coded in accordance with the second coding method. In an advantageous manner the insertion device can be included in a data source or in the processing device or in a data sink but they can also be accommodated in a separate housing as a separate insertion device; in all cases the insertion device are included in the path in which the information packet stream flows. Each of the information packet streams supplied by the insertion device advantageously comprises digital data coded in accordance with the first coding method, at least in further information packets, which data can be decoded in a multitude of apparatuses and which provide the user of one of these apparatuses with additional information relating to the other information packets of the information packet stream, which cannot be decoded by means of the apparatus. Further, reference is made to the advantages mentioned in connection with the system in accordance with the invention by the provision of insertion devices.

In insertion devices having the characteristic features defined above, it has proved to be advantageous if, in addition, a picture information memory has been provided, which memory stores digital data coded in accordance with the first coding method and representing at least picture information, and when control information appears the packet stream generator is adapted to insert coded digital data stored in and read out of the picture information memory into further information packets of the information packet stream, This yields insertion devices having a picture information memory which stores the digital data coded in accordance with the first coding method, which digital data represent additional information in the form of picture information and which can be inserted directly into further information packets of an information packet stream which can be supplied by the insertion devices. Advantageously, the provision of first coding devices in the insertion devices can be dispensed with, as a result of which particularly low-cost insertion devices can be realized.

In insertion devices having the characteristic features defined above, it has further proved to be advantageous if, in addition, the insertion device is adapted to receive an MPEG transport stream as information packet stream, which in MPEG transport stream packets in accordance with an MPEG standard (ISO/IEC 11172-1, ISO/IEC 13.818-1), contains digital data coded in accordance with an MPEG coding method in compliance with an MPEG standard (ISO/IEC 11172-2, ISO/IEC 11172-3, ISO/IEC 13.818-2or ISO/IEC 13.818-3) and/or in accordance with a second coding method, and the detection device is adapted to detect digital data contained in information packets and coded in accordance with a second coding method and to supply control information upon detection of such data, and when control information appears the packet stream generator is adapted to insert further digital data coded in accordance with the MPEG method into further MPEG transport stream packets of the MPEG transport stream. In this respect, reference is made to the advantages mentioned in connection with the system in accordance with the invention when the MPEG coding method is used.

The invention will now be described in more detail with reference to four embodiments shown in the drawings and given by way of examples but to which the invention is not limited.

FIG. 1 is a diagrammatic representation in the form of a block diagram which sows a system in accordance with a first embodiment of the invention, in which an information packet stream can be supplied from a transmitting device to a recording and reproducing apparatus and to a set-top box and in which both the recording signal path and the reproduction signal path of the recording and reproducing apparatus include insertion devices for inserting additional information into the information packet stream.

FIG. 1 also shows a system in accordance with a second embodiment of the invention which a DVHS apparatus forms a data source, a set-top box forms a processing device, and a TV set and a computer each form a data sink.

Figure 2:
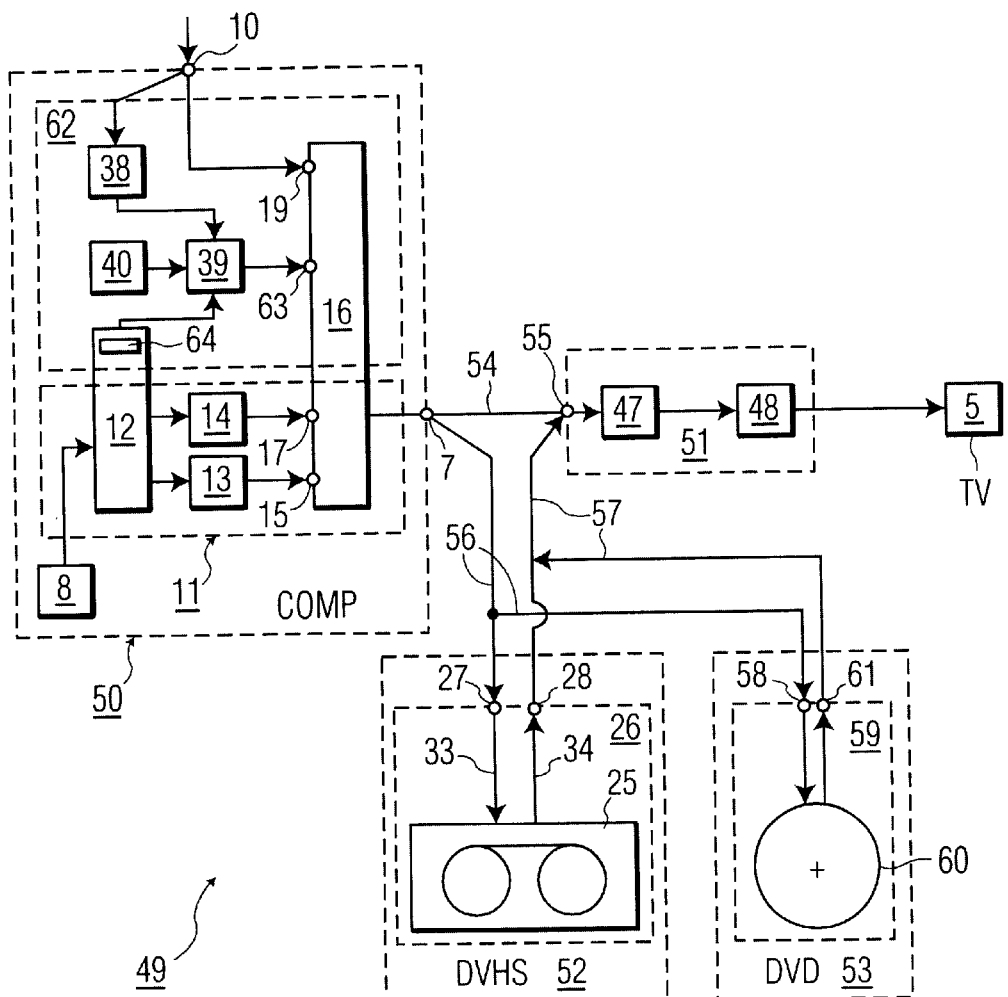

FIG. 2 is a diagrammatic representation in the form of a block diagram which shows a system in accordance with a third embodiment of the invention, in which a computer, which forms a data source, includes insertion devices for inserting additional information into the information packet steam which can be supplied by the computer, which information packet stream together with the additional information can be recorded in recording apparatuses and which can be reproduced by means of a TV set.

Figure 3:
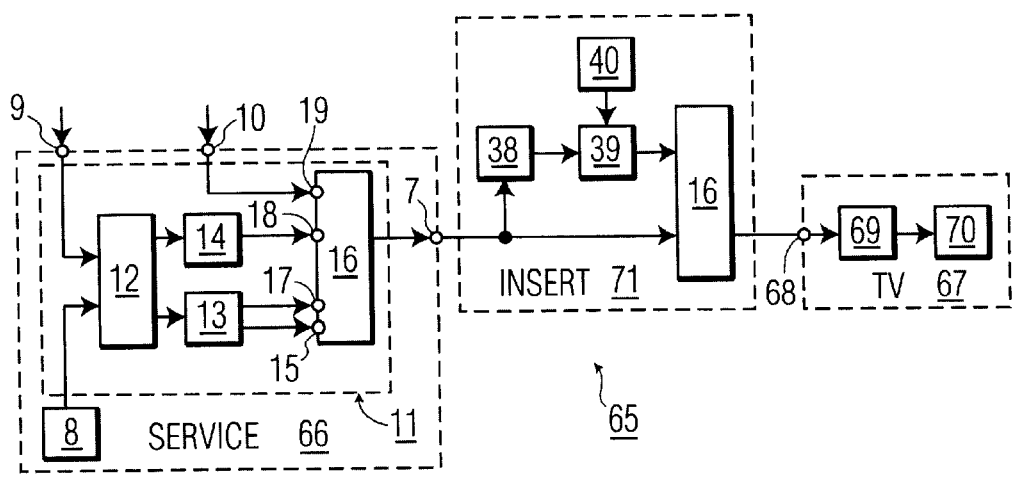

FIG. 3 is a diagrammatic representation in the form of a block diagram which shows a system in accordance with a fourth embodiment of the invention, in which a cable TV service device can supply an information packet stream to a TV set via a cable TV system, an adapter unit including insertion devices being arranged between the cable TV service device and the TV set, by means of which insertion devices additional information can be inserted into the information packet stream when the information packets exclusively comprises digital data coded by devices of a coding method other than the MPEG coding method.

FIG. 1 is a diagrammatic representation in the form of a block diagram which shows a system 1 in accordance with a first embodiment of the invention, which system comprises a transmitting device 2, a set-top box 3, a DVHS apparatus, a TV set 5 and a computer 6. In the first embodiment of the invention the transmitting device 2 forms a data source, the set-top box 3 forms a processing device, and the DVHS apparatus 4 is a recording apparatus which forms a data sink.

The transmitting device 2 is adapted to transmit television programs which comprise picture information and sound information and to transmit data information which can be associated with a television program. On an information output 7 the transmitting device 2 can supply information in the form of a DVB information packet stream in accordance with the international DVB standard "Digital Video Broadcasting", ETSI, TM1217 Rev. 6 of Mar. 24, 1997.

For this purpose, the transmitting device 2 comprises an information memory 8 which stores the digital data representing the picture information and sound information for a television program. The information memory 8 is formed by a hard disk. However, an information memory can alternatively be formed by a multitude of other known storage media The transmitting device 2 further comprises a first information input 9 via which an external source, which can be for example a television camera or a computer, can be applied to the transmitting device 2. The transmitting device 2 further comprises a second information input 10, via which an MPEG transport stream containing coded digital data in accordance with the MPEG standard (ISO/IEC 11171-1, ISO/IEC 13.818-1) from a firer external source can be applied to the transmitting device 2.

An MPEG transport stream comprises MPEG transport stream packets having a length of 188 bytes. Bach MPEG transport stream packet has a header segment and an information segment. The information segment contains coded digital data representing picture information, sound information or data information. Each header segment of an MPEG transport stream packet inter alia includes a packet stream identification PID. MPEG transport stream packets which contain picture information for a television program have a common packet stream identification PID and form a first sub-stream of an MPEG transport stream. MPEG transport stream packets which contain sound information for a television program have another packet stream identification PID and form a second sub-stream in the MPEG transport stream. The sub-streams associated with a television program form a program current. In this way an MPEG transport stream can comprise a plurality of sub-streams and program streams, the MPEG transport stream packets of each sub-steam having an individual packet stream identification PID.

An MPEG transport stream farther includes table information in further MPEG tort stream packets. Now a program association table (PAT) and a program map table (PMT) will be considered in more detail. A program association table contains information about the number of program stream transmitted in the MPEG transport stream. Furthermore, for each program stream referred to in a program association table a program map table is transmitted, which table specifies the sub-streams which are associated with the program stream and which are identified by their packet stream identifications PID.

By way of example, one of these program streams can contain the picture information and the sound information of a television program entitled "Austria". In the program association table of this program stream MPEG transport stream packets containing the picture information of the television broadcast can then, for example, included in a picture information sub-stream identified by the packet stream identification PID=19. MPEG transport stream packets containing the sound information of the television program can then for example, be included in a sound information sub-stream identified by a packet stream identification PID=20. In this way, an allocation of the sub-streams to individual program streams and, if applicable, television programs is laid down. Furthermore, by evaluation of the table information of the program map table it is possible to detect which sub-stream contains picture information, sound information or data information.

The transmitting device 2 comprises first source 11. The first source 11 include coding selection device 12 adapted to read out digital data stored in the information memory 8. Moreover, the digital data applied to the first information input 9 of the transmitting device 2 can be applied to the coding selection device 12. Furthermore, in a manner not shown in FIG. 1 control information about the type of digital data applied to the selection device 12 can be applied to the coding selection device 12 by a technician in charge of the transmitting device 2.

When the information memory 8 stores digital data representing, for example, the television proven entitled "Austria", said digital data can be applied to the coding selection device 12. At the same time digital data from a computer data base can be applied to the coding selection device 12 via the first information input 9, which data base stores data information about the population, geographical data and economic data of Austria, which data is applied to the transmitting device 2 from a computer, not shown in FIG. 1, which is connected to the information input 9 and which forms an external source. In response to control information from a technician in charge of the transmitting device 2 the picture information and sound information are applied to a first coding device 13 and the data information is applied to a second coding device 14.

The first coding device 13 are adapted to code the applied digital data by an MPEG coding method in accordance with an MPEG standard. Picture information is then coded by an MPEG coding method in accordance with an MPEG standard (ISO/IEC1171-2, ISO/IEC13.818-2) and sound information is coded by an MPEG coding method in accordance with an MPEG standard (ISO/IEC11171-3, ISO/IEC13.818-3). The first coding device 13 are further adapted to insert the coded digital data into MPEG transport stream packets of a picture information sub-stream for picture information and a sound information sub-stream for sound information, as already described hereinbefore. The first coding device are adapted to supply the picture information sub-stream to a first stream input 15 of a packet stream generator 16 in the first source 11. The first coding device are Her adapted to supply the sound information sub-stream to a second substream input 17 of the packet stream generator 16.

The second coding device 14 are adapted to code the applied digital data in accordance with a second coding method, in the present case the HTML coding method. This HTML coding method codes digital data in another manner than defined by the MPEG standard and is used in conjunction with internet pages. The second coding device 14 are adapted to insert coded digital data into MPEG transport stream packets of a data information sub-stream which contains so-called "private data". When a program map table of a data information sub-stream indicates that the data information sub-stream contains so-called "private data", the coding method by which such "private data" are coded is can be chosen freely in accordance wit the MPEG standard (ISO/IEC11171-1, ISO/IEC13.818-1). The second coding device 14 are adapted to supply the data information sub-stream to a third sub-stream input 18 of the packet stream generator 16.

An MPEG sport stream applied to the second information input 10 of the transmitting device 2 can be supplied to a fourth sub-stream input 19 of the packet stream generator 16 as a fourth sub-stream. Tis MPEG transport stream may comprise, for example, digital data from an internet data base coded in accordance with an arbitrary coding method and supplied by a computer connected to the second information input 10 and not shown in FIG. 1. In an associated program map table this fourth sub-stream is identified as a further data information sub-steam which contains so-called "private data", because it is unknown by which coding method the data of the Internet data base have been coded.

The packet stream generator is adapted to insert the sub-streams applied to its sub-stream inputs 15, 16, 17, 18 and 19 into an MPEG transport stream, the packet stream generator 16 inserting the individual MPEG transport steam packets of the sub-streams into an MPEG transport stream and adapting the table information to this MPEG transport stream. A program association table indicates the presence of three program streams, each having an associated program map table. The first program map table contains a packet stream identification PID of the picture information sub-stream and of the sound information sub-stream of the television program. A second program association table contains a packet stream identification PID of the data information sub-stream. A third program association table contains a packet stream identification PID of the further data information sub-stream, The packet stream generator 16 is adapted to supply an MPEG transport stream including the four sub-streams to a DVB transmission processing stage 20.

It is to be noted that the first coding device 13 and the second coding device 14 can also be adapted to supply coded digital data to the packet stream generator 16 and it is no sooner than in the packet stream generator that said data is inserted into a MPEG transport stream supplied by the packet stream generator 16.

It is to be noted that the second coding device 14 can also be adapted to code digital data in accordance with another coding method than the HTML coding method.

The applied BEG transport stream is processed in the DVB transmission processing stage 20, in which inter alia the MPEG transport stream error correction code is applied, as defined in the DVB standard. The DVB transmission processing stage 20 can supply a DVB information packet stream to the information output 7 of the transmitting device 2. A DVB information packet stream at the information output 7 of tie transmitting device 2 can be applied to a DVB input 22 of the set-top box 3 via an information link 21. The information link 21 can be formed by a satellite link, or a link by means of terrestrial antennas or via a cable TV system.

The set-top box 3 comprises a DVB reception processing stage 23 which can receive a DVB information packet stream from the DVB input 22. The DVB reception processing stage 23 is adapted to detect the MPEG transport stream packets contained in the DVB information packet stream using error correction methods and to supply an MPEG transport stream to a BEG connector 24 of the set-top box 3.

To record an MPEG transport stream applied to the DVHS apparatus 4 as a DVHS information packet stream on a magnetic tape of a magnetic-tape cassette 25 and to reproduce a DVHS information packet stream recorded on the magnetic tape of the magnetic-tape cassette 25 as an MPEG transport stream the DVHS apparatus 4 comprises a processing device 26. A DVHS information packet stream complies with the DVHS standard (Victor Company of Japan, No. 07015 of Jul. 25, 1997).

For this purpose, the processing device 26 have an MPEG input 27, via which an MPEG transport stream can be applied to the processing device 26. In a recording mode of the DVHS apparatus 4 the processing device 26 form a recording device and are adapted to record the MPEG transport stream applied to them. The processing device 26 further comprises an MPEG output 28 at which an MPEG transport stream reproduced by the processing device 26 is available. In a reproduction mode of the DVHS apparatus the processing device 26 form source and are adapted to reproduce a DVHS information packet stream recorded on the magnetic tape of the magnetic-tape cassette as an MPEG transport stream.

The processing device 26 have a first data rate stage 29. The first data rate stage 29 is connected to the MPEG input 27 and is adapted to insert so-called dummy bits into the MPEG transport stream applied to the processing device 26. This first data rate stage 29 forms a coupling element between the MPEG standard, which allows a strongly variable data rate, and the DVHS standard, in accordance with which only data with a constant data rate of 14.1 megabit/s is recorded on the magnetic tape of the magnetic-tape cassette 25. The processing device 26 further include a time marker stage 30 which can supply time information to the first data rate stage 29. In a manner not shown in FIG. 1, the time information is synchronized with the MPEG transport stream by means of information in the MPEG transport stream. The first data rate stage 29 is further adapted to insert the time information applied to it from the time marker stage 30 into each MPEG transport stream packet of the MPEG transport stream applied to the first data rate stage 29.

An information packet stream supplied by the first data rate stage 29, which has a constant data rate and contains time information, can be applied to a redundancy stage 31. In the redundancy stage 31 additional redundancy information is added to the information packets of the information packet stream in accordance with the DVHS standard, in order to enable error correction for a reproduced information packet stream. An information packet stream supplied by the redundancy stage 31 can be applied to a buffer stage 32 of the processing device 26. An information packet stream, which is briefly buffered in the buffer stage 32 for further processing, can be recorded as a DVHS information packet stream on the magnetic tape of the magnetic-tape cassette 25 via an operational recording link 33 in a recording mode of the DVHS apparatus, as is generally known.

A DVHS information packet steam recorded on the magnetic tape of the magnetic-tape cassette 25 can be supplied as an MPEG transport stream by the processing device 26 in a recording mode of the DVHS apparatus 4, which stream corresponds to the MPEG transport stream applied to the MPEG input 27 of the processing device 26 during recording of the DVHS information packet stream. For this purpose, a reproduced DVHS information packet strewn is applied to the buffer stage 32 via an operational reproduction link 34. A DVHS information packet stream, which is briefly buffered in the buffer stage 32 for further processing, can be applied to an error correction stage 35. The error correction stage 35 is adapted to evaluate the redundancy information, which has been added to the information packet stream to be recorded in the redundancy stage 31, and to correct errors produced in the reproduced information packet stream as a result of the recording-reproduction process.

An information packet stream which has been processed by the error correction stage 35 can be applied to a second data rate stage 36. The second data rate stage 36 is adapted to remove the dummy bits inserted in the first data rate stage 29. In the reproduction mode the second data rate stage 36 can receive time information from the time marker stage 30. The second data rate stage 36 is adapted to evaluate the time information in the reproduced information packet stream, which information has been inserted in the first data rate stage 29, and to supply an MPEG transport stream packet when the time information of the MPEG transport stream corresponds to time information from the time marker stage 30. As a result of this, MPEG transport stream packets which are applied to the processing dice in a non-continuous manner are supplied again in the appropriate non-continuous manner.

The DVHS apparatus 4 comprises an insertion means 37 which are adapted to insert further digital data coded in accordance with the MPEG coding method into further MPEG transport steam packets of the MPEG transport stream—when digital data coded by means of another, i.e. second coding method and not by means of the MPEG coding method are present in the MPEG transport stream packets of he MPEG transport stream applied from the MPEG connector 24 to the DVHS apparatus 4. For this purpose, the insertion device 37 comprise detection device 38 arranged to receive an MPEG transport stream applied from the MPEG connector 24 to the DVHS apparatus 4. The detection device 38 are adapted to evaluate table information contained in the MPEG transport stream, particularly the table information of a program association table and a program map table.

When the MPEG transport stream of the afore-mentioned example with three program streams having four sub-streams are received from the MPEG connector the detection device 38 detect, by evaluating the table information of the MPEG tort stream, that the MPEG transport stream includes four sub-streams, of which only the picture information sub-stream and the sound information sub-stream of the first program stream comprise coded digital data coded in accordance with the MPEG coding method. The detection device 38 are adapted to supply control information to an insertion stage 39, which control information indicates that the data information sub-stream of the second program stream and the further data information sub-stream of the third program stream, which are identified by their packet stream identification ID in the control information, include coded digital data coded in accordance with another, i.e. a second coding method and not coded in accordance with the MPEG coding method.

The insertion device 37 include a picture information memory 40. The picture information memory 40 stores digital data representing picture information and coded in accordance with the MPEG coding method. The picture information comprise a text which can be displayed by the TV set 5 and which informs the user of the system 1 that, unfortunately, the received information cannot be reproduced because the TV set 5 is not suitable for this.

When control information generated and supplied by the detection device 38 is available the insertion stage 38 is adapted to read out the coded digital data stored in he picture information memory 40 and to insert this coded digital data into Gusher MPEG transport stream packets of two further sub-streams. For each of the two further sub-streams a packet stream identification PID is defined, which is not yet used in the MPEG transport stream. A first further sub-stream is allocated to the second program stream by the entry of the packet stream identification PID of the first further sub-stream into the program map table of the second program stream. A second further sub-stream is allocated to the third program stream by the entry of the packet stream identification PID of the second further sub-stream into the program map table of the third program stream.

The insertion device 37 are adapted to supply the further sub-streams generated in the insertion stage 39 and comprising MPEG transport stream packets to a first multiplex stage 41 of the insertion device 37. The first multiplex stage 41 can further receive the MPEG port stream applied from the MPEG connector 24 of the set-top box 3 to the DVHS apparatus 4. The first multiplex stage 41 is adapted to supply an MPEG transport steam including the two MPEG transport streams applied to it to the MPEG input 27 of the processing device 26 in order to record said stream in a recording mode of the DVHS apparatus 4, as already described hereinbefore.

In this way a DVHS apparatus 4 is obtained in which in a recording mode additional information in further MPEG transport stream packets, coded in accordance with the MPEG coding method, is inserted into an MPEG tort stream or individual program streams of the MPEG transport stream not including digital data coded in accordance with the MPEG coding method, in order to be recorded on the magnetic tape of the magnetic-tape cassette 25. This has the advantage that during the reproduction of an MPEG transport stream recorded on the magnetic tape of the magnetic tape cassette 25 by the DVHS apparatus 4 a use of a DVHS apparatus 4 receives additional information relating to sub-streams coded in accordance with another coding method than the MPEG coding method. Since MPEG decoders are widely used both in the field of home-entertainment electronics, in professional equipment and in the field of computer technology, this has advantage that the additional information coded in accordance with the MPEG coding method and inserted by the DVHS apparatus 4 can be processed and reproduced by a multitude of processing devices or data sinks. Moreover, independently of which program stream of an MPEG transport stream reproduced from the magnetic tape of the magnetic tape cassette 25 is selected by the user of the DVHS apparatus 4, the user receives either the picture information and sound information of a TV program or additional information that the reproduced information cannot be decoded by this reproducing apparatus. This is particularly important because otherwise, if a data information sub-stream has been selected for reproduction, the user of a DVHS apparatus is inclined to believe that the DVHS apparatus is defective because a TV set connected to this apparatus can reproduce neither picture information nor sound information.

It is to be noted that an MPEG transport stream recorded on the magnetic tape of the magnetic-tape cassette 25 by means of a DVHS apparatus 4 in accordance with the invention can be reproduced by any DVHS apparatus, which also yields the afore-mentioned advantages because the additional information has been recorded on the magnetic tape of the magnetic-tape cassette 25.

It is to be noted that not only—as in the above example—data information but also picture information and sound information can be coded in accordance with another coding method than the MPEG coding method. The afore-mentioned advantages are then also obtained in the case of a recording of an MPEG transport stream which includes picture information or sound information which has been coded in accordance with another coding method the MPEG coding method.

It is to be noted that the DVB reception processing stage 23 can also be adapted to select individual program streams of the MPEG transport stream. The DVB reception processing stage 23 then only supplies selected program streams to the DVHS apparatus 4 for the purpose of recording.

The insertion device 37 further have a control input 42 and a picture information input 43. With the aid of input means not shown in FIG. 1 the user of the DVHS apparatus 4 can apply fisher control information to the control input 42 when in a recording mode the DVHS apparatus 4 records an MPEG transport stream which, in a program stream or sub-stream, includes information coded by another coding method than the MPEG coding method, Moreover, the input device may also allow the user of the DVHS apparatus 4 to select a given program stream or sub-stream of the MPEG transport stream applied to the DVHS apparatus 4, which information can also be applied to the control input 42 in the further control information.

Such further control information can be applied from the control input 42 to the detection device 38. When further control information is present the detection device 38 are adapted to supply control information corresponding to the further control information to the insertion stage 39, which is then again adapted to insert digital data stored in the picture information memory into further MPEG transport stream packets of a further sub-stream, which sub-stream is inserted, by means of the first multiplex stage 41, into the MPEG transport stream applied to the DVHS apparatus 4.

This has the advantage that the user of the DVHS apparatus 4, when he knows that an MPEG transport stream including digital data not coded in accordance with the MPEG coding method is to be recorded by means of the DVHS apparatus 4, can make the insertion device 37 insert picture information coded in accordance with the MPEG coding method.

Furthermore, picture information represented by digital data coded by means of the MPEG coding method can be applied to the DVHS apparatus 4 via the picture information input 43. The coded digital data applied to the picture information input 43 of the DVHS apparatus 4 can be transferred to the insertion stage 39, which is adapted to insert the coded digital data applied to the picture information input 43 into further MPEG transport stream packets of a further sub-stream when picture information from the picture information input 43 is present and when corresponding control information from the detection device 38 is present. The further multiplex stage 41 inserts said further sub-stream together with the MPEG transport stream applied to the DVHS apparatus 4 into an MPEG transport stream.

This has the advantage that a user of the DVHS apparatus can add arbitrary picture information as additional information to a program steam or sub-stream of an MPEG transport stream during recording, which at least in one sub-stream contains only digital data not coded in accordance with the MPEG coding method. Additional information may include, for example, information about the coding method used for coding the coded digital data in the sub-stream. However, the additional information may also comprise information about the type of information to be recorded or the content of the information to be recorded.

It is to be noted that coed digital data stored in the picture information memory 40 or coded digital data applied to the picture information input 43 of the DVHS apparatus 4 can also represent audio information. This has the advantage that it is also possible to apply audio information in fib MPEG transport stream packets of a further sub-stream of an MPEG transport stream in order to be recorded on the magnetic tape of the magnetic-tape cassette 25. In this case the user of the DVHS apparatus 4 or of any arbitrary DVHS apparatus receives additional information in the form of sound information dug reproduction, which additional information draws his attention to the fact that the MPEG transport stream includes digital data which is coded in accordance with another coding method than the MPEG coding method and therefore cannot be reproduced by means of the TV set 5.

It is to be noted that coded digital data stored in the picture information memory 40 or digital data applied to the DVHS apparatus 4 via the picture information input 43 can also represent data information. It is then possible, for example, to add software necessary for decoding digital data coded in accordance with a further second coding method to the reproduced MPEG transport stream in further MPEG transport stream packets, This software can be detected in a suitable computer 6 and be used for decoding the digital data coded in accordance with the further second coding method.

FIG. 1 at the same time represents a system 1 in accordance with a second embodiment of the invention. In this system 1 the DVHS apparatus 4 forms a data source, the set-top box 3 forms a processing device, and the TV set 5 and the computer 6 each form a data sink. The magnetic-tape cassette 25, the operational reproduction link 34, the buffer stage 32, the error correction stage 35, the second data rate stage 36, and the time marker stage 30 now form second source 44. A DVHS information packet stream recorded on the magnetic tape of the magnetic-tape cassette 25 can be supplied to the MPEG output 28 as an MPEG transport stream in a reproduction mode of the DVHS apparatus 4, as already described hereinbefore.

The insertion device 37 have a second multiplex stage 45 to which a reproduced MPEG transport stream from the MPEG output 28 can be applied. An MPEG transport stream available on the MPEG output 28 can further be applied to the detection device 38. The detection device 38 are adapted to evaluate table information contained in a reproduced MPEG transport stream and to supply control information, as already described hereinbefore for the system 1 in accordance with the first embodiment of the invention. The insertion stage 39 is connected to the second multiplex stage 45 and is adapted to supply MPEG transport stream packets of a Her sub-stream generated in the insertion stage 39 to the second multiplex stage 45. The second multiplex stage 45 is adapted to supply an MPEG transport stream comprising the two applied MPEG transport streams to an MPEG reproduction output 46 of the insertion device 37. The MPEG reproduction output 46 has one side connected to the computer 6 and the other side to the MPEG connector 24.

The set-top box 3 comprises an MPEG program stream decoder 47. An MPEG transport stream applied via the MPEG connector 24 of the set-top box 3 can be supplied to the MPEG program stream decoder 47. The MPEG program stream decoder 47 is adapted to select a program stream from the MPEG transport stream. With the aid of input device not shown in FIG. 1—for example with the aid of channel up/down keys—a user of the set-top box 3 can select a desired program stream contained in a reproduced MPEG transport stream or an MPEG transport stream supplied by the DVB reception processing stage 23. For this, the MPEG program stream decoder 47 is adapted to evaluate the program association table included in the MPEG transport stream, which table specifies all the program streams included in the MPEG transport stream. When the user of the set-top box 3 has selected one of these program streams the MPEG program stream decoder 47 is adapted to evaluate the program map table associated with the selected program stream. The program map table specifies the packet stream identifications ID of the associated sub-streams of the selected program stream. The selected sub-streams can be supplied by the MPEG program stream decoder 47.

The set-top box 3 further comprises a decoder 48 to which the sub-streams supplied by the MPEG program steam decoder 47 can be applied. The decoder 48 is adapted to decode the coded digital data contained in MPEG transport stream packets of the sub-streams when these packets have been coded in accordance with the MPEG coding method. The decoder 48 are adapted to supply decoded information—particularly picture information and sound information—to the TV set 5 connected to the set-top box 3.

When an MPEG transport stream has been recorded on the magnetic tape of the magnetic-tape cassette 25 as a DVHS information packet stream by means of a known DVHS apparatus not having insertion device the MPEG transport stream may include sub-streams comprising only digital data coded in accordance with another coding method than the MPEG coding method. In an example an MPEG transport stream having two program streams have been recorded on the magnetic tape of the magnetic-tape cassette 25. A first program stream comprises a picture information sub-stream and a sound information sub-stream, which are each identified by a packet stream identification ID. In an associated program map table the first packet stream is identified as a packet steam comprising a picture information sub-stream and a sound information sub-stream. A second program stream is formed by a data information sub-stream, which is identified by a packet stream identification ID. In a program map table associated with the second program stream the data of the second program stream are identified as so-called "private data". The first program stream contains digital data coded in accordance with the MPEG coding method and representing, for example, a television program entitled "Austria". The second program stream contains digital data coded in accordance with the an HTML coding method (Hypertext Markup Language) and representing, for example, computer data relating to Austria.

In a reproduction mode of the DVHS apparatus 4 the DVHS information packet stream recorded on the magnetic tape of the magnetic tape cassette 25 is reproduced and applied to the MPEG output 28 as an MPEG transport stream, the MPEG transport stream comprising the program streams just described. The detection device 38 evaluates the table information included in the MPEG transport stream and thus detect that the second program stream contains "private data". Subsequently, the detection device 38 supply control information to the insertion stage 39, which control information indicates that a further sub-stream with MPEG transport stream packets should be added to the second program stream, in which packets should contain digital data stored in the picture information memory 40 and coded in accordance with the MPEG coding method. For the further MPEG transport stream packets of the Her sub-stream a packet stream identification PID not yet used in the MPEG transport stream is defined in accordance with the control information from the detection device 38. This packet stream identification PID is entered in the program map table of the second program stream. The insertion device 37 supply the tinter sub-stream generated in the insertion stage 39 to the second multiplex stage 45. The second multiplex stage 45 supplies an MPEG transport stream which includes the two applied MPEG transport streams to the MPEG output 46 of the insertion device 37.

When the user of the system 1 selects the first program stream in the reproduced MPEG transport stream with the aid of the MPEG program stream decoder 47 in a reproduction mode of the DVHS apparatus 4, the TV set 5 is adapted to reproduce, for example, the television program entitled "Austria". On the other hand, when the user of the system 1 selects the second program stream in the reproduced MPEG transport stream with the aid of the MPEG program stream decoder 47, which second program stream contains coded digital data that cannot be decoded by the decoder 48, the advantage is obtained that the MPEG transport stream packets inserted into the further sub-strewn of the second program stream are decoded by the decoder 48 and displayed by the TV set 5. As a result, the user is informed that the data information sub-stream of the second program stream cannot be reproduced by the TV set 5. The user can then, for example, process the reproduced MPEG transport stream by means of the computer 6, which in a manner not shown in FIG. 1 is adapted to decode digital data coded in accordance with the HTML coding method.

It is to be noted that—as already described for the system 1 in accordance with the first embodiment of the invention—in a reproduction mode of the DVHS apparatus 4 it is also possible to apply picture information to the picture information input 43, which information is inserted as additional information into further MPEG transport stream packets upon the application of control information to the control input 42 and is supplied by the DVHS apparatus together with the reproduced MPEG transport stream.

It is to be noted that in the reproduction mode it is also possible to insert sound information instead of picture information as additional information into finer MPEG transport stream packets.

FIG. 2 is a diagrammatic representation in the form of a block diagram which shows a second system 49 in accordance with a third embodiment of the invention, in which a computer 50 forms a data source, a set-top box 51 forms a processing device, and the TV set 5 and a DVHS apparatus 52 as well as a DVD apparatus 53 each form a data sink.

The computer 50 comprises first source 11 which include coding selection device 12, fast coding device 13, second coding device 14 and a packet stream generator 16. The computer 50 further comprises an information memory 8, which stores picture information, sound information and data information. Furthermore, an MPEG transport stream can be applied to the computer 50 via a second information input 10. The packet stream generator 16 is adapted to supply information stored in the information memory 8 or to supply information applied to the second information input 10 of the packet stream generator 16 as an MPEG transport stream, as already described for the system 1 in accordance with the first embodiment of the invention. The packet stream generator 16 is thus adapted to supply the MPEG transport stream directly to an information output 7 of the computer 50. An MPEG transport stream on the information output 7 of the computer 50 can be supplied to a further MPEG input 55 of the set-top box 51. An MPEG transport stream from the information output 7 of the computer 50 can be supplied to a further MPEG input 55 of the set-top box 51 via a cable connection 54. An MPEG transport stream applied to the further MPEG input 55 can be applied to an MPEG program stream decoder 47, which is adapted to select program streams contained in the MPEG transport stream, as already described for the second embodiment. The MPEG program stream decoder 47 is adapted to supply the sub-streams of the selected program stream to decoder 48. The decoder 48 is adapted to decode the coded digital data contained in MPEG transport stream packets applied to the decoder 48 and coded in accordance with the MPEG coding method. The decoder 48 are further adapted to supply the decoded information as picture information and sound information to the TV set 5.

The DVHS apparatus 52 comprises processing device 26 whose function has already been described for the system 1 in accordance with the first embodiment of the invention. An MPEG transport stream available on the information output 7 of the computer 50 can be applied to an MPEG input 27 of the processing device 26 of the DVHS apparatus 52 via a second cable connection 56 in order to be recorded in a recording mode of the DVHS apparatus 52. In a reproduction mode of the DVHS apparatus 52 a reproduced MPEG transport stream can be applied from the MPEG output 28 of the processing device 26 to the further MPEG input 55 of the set-top box 51 via a third cable connection 57.

An MPEG transport stream appering on the information output 7 of the computer 50 can further be applied to a DVD input 58 of DVD processing device 59 of the DVD) apparatus 53 via the second cable connection 56. An MPEG A stream applied to the DVD processing device 59 can be recorded on a DVD disc 60, which is known per se. An MPEG transport stream reproduced by the digital data program association table digital data processing device 59 of the DVD apparatus 53 can be applied to the further MPEG input 55 via the third cable connection 57.

An MPEG transport stream applied to the further MPEG input 55 of the set-top box 51 by the DVHS apparatus 52 or the DVD apparatus 53 can be supplied from the set-top box 51 to the TV set 5, as already described hereinbefore.

The computer 50 now comprises second insertion device 62 which, in the case that digital data coded by another coding method than the MPEG coding method and contained in MPEG transport stream packets are available, are adapted to insert further digital data coded in accordance with the MPEG coding method into further MPEG transport stream packets of the MPEG transport stream. For this purpose, the second insertion device 62 comprise detection device 38 arranged to receive an MPEG transport stream applied to the second information input 10 of the computer 50. The detection device 38 are adapted to evaluate table information contained in the MPEG transport stream and to detect sub-stream which do not contain digital data coded in accordance with the MPEG coding method. The detection device 38 are adapted to supply control information to an insertion stage 39 when a sub-stream of the MPEG transport stream only comprises digital data coded in accordance with another coding method an the MPEG coding method. Control information applied to the insertion stage 39 includes the packet stream identification ID which identifies this sub-stream.

The second insertion device 62 further comprise a picture information memory 40 which stores the coded digital data which represent text which can be displayed by the TV set 5 and which inform the user of the system 49 that the program stream selected with the aid of the MPEG program stream decoder 47 has been coded by a further coding method ad cannot be decoded by the decoder 48. In the case that control information generated and supplied by the detection device 38 is available the insertion stage 39 is adapted to insert the digital data stored in the picture information memory 40 into further PEG transport stream packets of a further sub-stream. The insertion stage 39 is adapted to supply the further sub-stream generated in the insertion stage 39 to a fifth sub-stream input 63 of the packet stream generator 16.

The coding selection device 12 have insertion activation device 64. As already described for the system in accordance with the first embodiment of the invention, the coding selection device 12 are adapted to read out digital data stored in the information memory 8 and to supply the digital data to the first coding device 13 or the second coding device 14. The insertion activation device 64 of the coding selection device 12 are then adapted to supply digital data to the second coding device 14 and Her to supply an insertion control signal to the insertion stage 39. When an insertion control signal is available in the insertion stage 39 the insertion stage 39 is adapted to read out the coded digital data stored in the picture information memory 40 and to insert the coded digital data into further MPEG transport stream packets of a further sub-stream. The insertion stage 39 supplies this further sub-stream to the fifth sub-stream input 63 of the packet stream generator 16. The packet stream generator 16 is adapted to supply an MPEG transport stream containing the MPEG transport streams applied to this generator to the information output 7 of the computer 50, as already described for the system 1 in accordance with the first embodiment of the invention.

In this way a data source fanned by the computer 50 is obtained, which supplies an MPEG transport stream in which in the case of sub-streams comprising only digital data coded it accordance with another coding method than the MPEG coding method additional information has been inserted into further MPEG transport stream packets of a further sub-stream which additional information can be decoded by the decoder 48 and can be displayed by means of the TV set 5. Likewise, the further sub-stream in the MPEG transport stream is recorded on the magnetic tape of a magnetic-tape cassette 25 in a recording mode of the DVHS apparatus 52 and is recorded on the DVD disc 60 in a recording mode of the DVD apparatus 53. As a result of his, a user who directly views the MPEG transport stream from the computer 50 by means of the TV set 5 via the set-top box 51 receives additional information about a sub-stream which cannot be decoded by the decoder 48. Furthermore, a user of a DVHS apparatus or a DVD apparatus who, by means of the TV set 5, reproduces an MPEG transport stream recorded on the magnetic-tape cassette 25 or the DVD disc 60, initially supplied by the computer 50 and subsequently reproduced from the magnetic-tape cassette 25 or the DVD disc 60, receives additional information about a sub-stream which cannot be decoded by the decoder 48.

FIG. 3 is a diagrammatic representation in the form of a block diagram which shows a system 65 in accordance with a fourth embodiment of the invention. This system 1 comprises a cable TV service device 66 which forms a data source and which supplies television programs and further information to a plurality of TV sets, which each form 8 data sink, via a local cable TV system of a hotel. The means provided in the cable TV service device 66 correspond to those of the transmitting device 2 which forms part of the system 1 shown in FIG. 1 and whose operation has been described with reference to FIG. 1. However, a difference with the transmitting device 2 is that the cable TV service device 66 does not comprise a DVB processing stage 20—as shown in FIG. 1—because the cable TV service device 66 does not effect an additional coding in accordance with the DVB standard.

In the system 65 shown in FIG. 3 the plurality of TV sets connected to the cable TV system is represented as a TV set 67. The TV set 67 can receive an MPEG transport stream via a further MPEG input 68. The TV set 67 comprises TV processing device 69. An MPEG transport stream applied to the further MPEG input 68 of the TV set 67 can be transferred to the TV processing device 69. An MPEG sport stream applied to the TV processing device 69 can be processed in the TV processing device 69 and can then also be decoded in accordance with the MPEG decoding method. The TV processing device 69 thus form processing device of the system 65 which are accommodated in the housing of the TV set 67.

The TV set 67 further comprises display device 70 to which decoded data can be applied from the TV processing device 69 and which are adapted to reproduce picture information and sound information contained in the decoded data.

The system 65 now has third insertion device 71 arranged between the information output 7 of the cable TV service device 66 and the further MPEG input 68 of the TV set 67. The third insertion device 71 comprise detection device 38, an insertion stage 39, a picture information memory 40 and a packet stream generator 16. An MPEG transport stream supplied by the cable TV service device 66 via its information output 7 can be applied both to the detection device 38 and to the packet stream generator 16. When the MPEG transport stream includes a program stream or a sub-stream which does not contain digital data coded in accordance with the MPEG coding method the third insertion device 71 are adapted to insert further MPEG transport stream packets of a further sub-stream into the MPEG transport stream supplied by the cable TV service device 66. The operation of the third insertion device 70 then corresponds to the operation as already described hereinbefore for the second insertion device 62 shown in FIG. 2.

Thus, it is achieved that the third insertion device 71, which are accommodated in a separate adapter unit, can be included in a data link between two arbitrary apparatuses. The third insertion device 71 ate then adapted to insert picture information or also other additional information into an MPEG transport stream which comprises coded digital data coded in accordance with another coding method than the MPEG coding method.

It is to be noted that the picture information stored in the picture information memory 40 may also comprise information indicating that the magnetic tape of a magnetic tape cassette 25 is damaged to such an extent that no valid data in accordance with the MPEG coding method can be reproduced and, as a result, the reproduction of the information recorded on the magnetic tape is not possible.

Moreover, it is to be noted that the first coding method can also be another coding method than the MPG coding method. However, it is then advantageous to use as the first coding method a coding method which can be processed by multitude of apparatuses already sold and on the market.

Furthermore, it is to be noted that the detection device can be implemented by the read-out of table information included in an information packet stream but also by the active analysis of received coded digital data for the identification of a given coding method. Certain bit sequences and certain regular events in a received information packet stream can then be used for the detection of a given coding method.

Finally, it is to be noted that the detection device can also be adapted to detect two or more different coding methods and supply control information to an insertion stage for the insertion of at least one item of additional information only if the information packet stream applied to the detection device includes digital data coded in accordance with a second coding method.

What is claimed is:

1. A System (1; 49; 65) comprising a data source (2, 4; 50; 66) for supplying an information packet stream, and a processing device (3; 51; 69) for processing an information packet stream, and a data sink (4, 5, 6; 52, 53; 67) for receiving an information packet stream, the data source (2, 4; 50; 66) comprising source means (11, 44) for supplying to the processing device (3; 51; 69) an information packet stream including information packets, which information packets contain digital data coded in accordance with a first coding method and in accordance with a second coding method and representing picture information or sound information or data information, and the system (1; 49; 65) including decoding means (48) adapted to decode digital data contained on the information packets and coded in accordance with the first coding method, characterized in that the system (1; 49; 65) comprises insertion means (37; 62; 71) which—when digital data coded in accordance with a second coding method are present in the information packets—are adapted to insert further digital data coded in accordance with the first coding method into further information packets of the information packet stream, the coded further digital data containing picture information or sound information as additional information relating to the digital data contained in the information packets, which digital data are coded in accordance with the second coding method and can therefore not be decoded correctly by the decoding means (48).

2. A system (1; 49; 65) as claimed in claim 1, characterized in that the source means (2, 4; 50; 66) are adapted to supply an MPEG transport stream comprising MPEG transport stream packets as an information packet stream in accordance with an MPEG standard (ISO/IEC 11172-1, ISO/IEC 13.818-1) to the processing device (3; 51: 69), which MPEG transport stream packets contain digital data, which represent picture information or sound information or data information, coded in accordance with an MPEG coding method in compliance with an MPEG standard (ISO/IEC 11172-2, ISO/IEC 11172-3, ISO/IEC 13.818-2 or ISO/IEC 13.818-3) and in accordance with a second coding method, and the system (1; 49; 65) comprises decoding means (48) adapted to decode digital data contained in the MPEG transport stream packets and coded in accordance with and MPEG coding method, and the insertion means (37; 62; 71), when digital data coded in accordance with a second coding method and contained in the MPEG transport stream packets are present, are adapted to insert further digital data coded in accordance with an MPEG method into further MPEG transport stream packets of the MPEG transport stream.

3. A data source (2, 4; 50; 66) for supplying an information packet stream, comprising source means (11, 44) for supplying an information packet stream including information packets, which information packets contain digital data coded in accordance with a first coding method and in accordance with a second coding method and representing picture information or sound information or data information, characterized in that insertion means (37; 62; 71) have been provided, which insertion means—when digital data coded in accordance with a second coding method are present in the information packets—are adapted to insert further digital data coded in accordance with the first coding method into further information packets of the information packet stream, the coded further digital data containing picture information or sound information as additional information relating to the digital data contained in the information packets.

4. A data source (2; 50; 66) as claimed in claim 3, characterized in that the source means (11) comprise first coding means (13) for coding digital data in accordance with a first coding method and for supplying coded digital data, and the source means (11) comprise second coding means (14) for coding digital data in accordance with a second coding method and for supplying coded further digital data, and the source means (11) include a packet stream generator (16) adapted to insert the coded digital data into information packets of an information packet stream and to insert the coded further digital data into further information packets of the information packet stream.

5. A data source (2; 50; 66) as claimed in claim 4, characterized in that the data source (2; 50; 66) is adapted to cooperate with an information memory (8) which stores digital data representing picture information or sound information or data information, and coding selection means (12) have been provided, which coding selection means are adapted to read out digital data stored in the information memory (8) and to supply the digital data selectively to the first coding means (13) or the second coding means (14), and the coding selection means (12), when digital data are supplied to the second coding means (14), are further adapted to supply an insertion control signal, and when an insertion control signal is present the packet stream generator (16) is adapted to insert further information packets into the information packet stream, which further information packets contain further digital data coded in accordance with the first coding method.

6. A data source (4) as claimed in claim 3, characterized in that detection means (38) have been provided, which detection means are arranged to receive an information packet stream and are adapted to detect digital data contained in information packets and coded in accordance with a second coding method and to supply control information upon detection of such data, and when control information appears the insertion means (37) are adapted to insert further digital data coded in accordance with the first coding method into further information packets of the information packet stream.

7. A data source (4) as claimed in claim 3, characterized in that the insertion means (37) include a picture information memory (40) which stores digital data coded in accordance with the first coding method and representing at least picture information, and when the information packets contain digital data coded in accordance with a second coding method the insertion means (37) are adapted to insert coded digital data stored in and read out of the picture information memory into further information packets of the information packet stream.

8. A data source (2, 4; 50; 66) as claimed in claim 3, characterized in that the source means (11; 44) are adapted to supply an MPEG transport stream comprising MPEG transport stream packets as an information packet stream in accordance with an MPEG standard (ISO/IEC 11172-1, ISO/IEC 13.818-1), which MPEG transport stream packets contain digital data coded in accordance with an MPEG coding method in compliance with an MPEG standard (ISO/IEC 11172-2, ISO/IEC 11172-3, ISO/IEC 13.818-2 or ISO/IEC 13.818-3) and/or in accordance with a second coding method, and the insertion means (37; 62; 71), when digital data coded in accordance with a second coding method and contained in the MPEG transport stream packets are present, are adapted to insert further digital data coded in accordance with the MPEG method into further MPEG transport stream packets of the MPEG transport stream.

9. A data sink (4) for receiving an information packet stream containing coded digital data in information packets, which digital data can be coded in accordance with a first coding method and a second coding method, comprising recording means (26) for the recording of recording data representing the picture information or sound information or data information contained in the received coded digital data, characterized in that insertion means (37) have been provided which—when digital data coded in accordance with a second coding method are present in the received information packets—are adapted to insert further digital data coded in accordance with the first coding method into further information packets of the information packet stream, the coded further digital data containing picture information or sound information as additional information relating to the digital data contained in the information packets and coded in accordance with a second coding method.

10. A data sink (4) as claimed in claim 9, characterized in that detection means (38) have been provided, which detection means are arranged to receive a received information packet stream and are adapted to detect digital data contained in information packets and coded in accordance with a second coding method and to supply control information upon detection of such data, and when control information appears the insertion means (37) are adapted to insert further digital data coded in accordance with the first coding method into further information packets of the information packet stream.

11. A data sink (4) as claimed in claim 9, characterized in that the insertion means (37) include a picture information memory (40) which stores digital data coded in accordance with the first coding method and representing at least picture information, and when the information packets contain digital data coded in accordance with a second coding method the insertion means (37) are adapted to insert coded digital data stored in and read out of the picture information memory (40) into further information packets of the information packet stream.

12. A data sink (4) as claimed in claim 9, characterized in that the data sink (4) is adapted to receive an MPEG transport stream as information packet stream, which in MPEG transport stream packets in accordance with an MPEG standard (ISO/IEC 11172-1, ISO/IEC 13.818-1), contains digital data coded in accordance with an MPEG coding method in compliance with an MPEG standard (ISO/IEC 11172-2, ISO/IEC 11172-3, ISO/IEC 13.818-2 or ISO/IEC 13.818-3) and in accordance with a second coding method, and the insertion means (37), when digital data coded in accordance with a second MPEG coding method and contained in the MPEG transport stream packets are present, are adapted to insert further digital data coded in accordance with the MPEG method into further MPEG transport stream packets of the MPEG transport stream.

13. Insertion means (37; 62; 71) adapted to receive an information packet stream which contains coded digital data in information packets, which digital data can be coded in accordance with a first coding method and a second coding method, characterized in that detection means (38) have been provided, which detection means are adapted to detect digital data contained in information packets and coded in accordance with a second coding method and to supply control information upon detection of such data, and a packet stream generator (16) has been provided, which generator when control information appears is adapted to insert further digital data coded in accordance with the first coding method into further information packets of the information packet stream, the coded further digital data representing picture information or sound information as additional information relating to the digital data contained in the information packets and coded in accordance with a second coding method.

14. Insertion means (37; 62; 71) as claimed in claim 13, characterized in that a picture information memory (40) has been provided, which memory stores digital data coded in accordance with the first coding method and representing at least picture information, and when control information appears the packet stream generator (16) is adapted to insert coded digital data stored in and read out of the picture information memory into further information packets of the information packet stream.

15. Insertion means (37; 62; 71) as claimed in claim 13, characterized in that the insertion means (37; 62; 71) are adapted to receive an MPEG transport stream as information packet stream, which in MPEG transport stream packets in accordance with an MPEG standard (ISO/IEC 11172-1, ISO/IEC 13.818-1), contains digital data coded in accordance with an MPEG coding method in compliance with an MPEG standard (ISO/IEC 11172-2, ISO/IEC 11172-3, ISO/IEC 13.818-2 or ISO/IEC 13.818-3) and in accordance with a second coding method, and the detection means (38) are adapted to detect digital data contained in information packets and coded in accordance with a second coding method and to supply control information upon detection of such data, and when control information appears the packet stream generator (16) is adapted to insert further digital data coded in accordance with the MPEG method into further MPEG transport stream packets of the MPEG transport stream.

* * * * *